Figure 1:
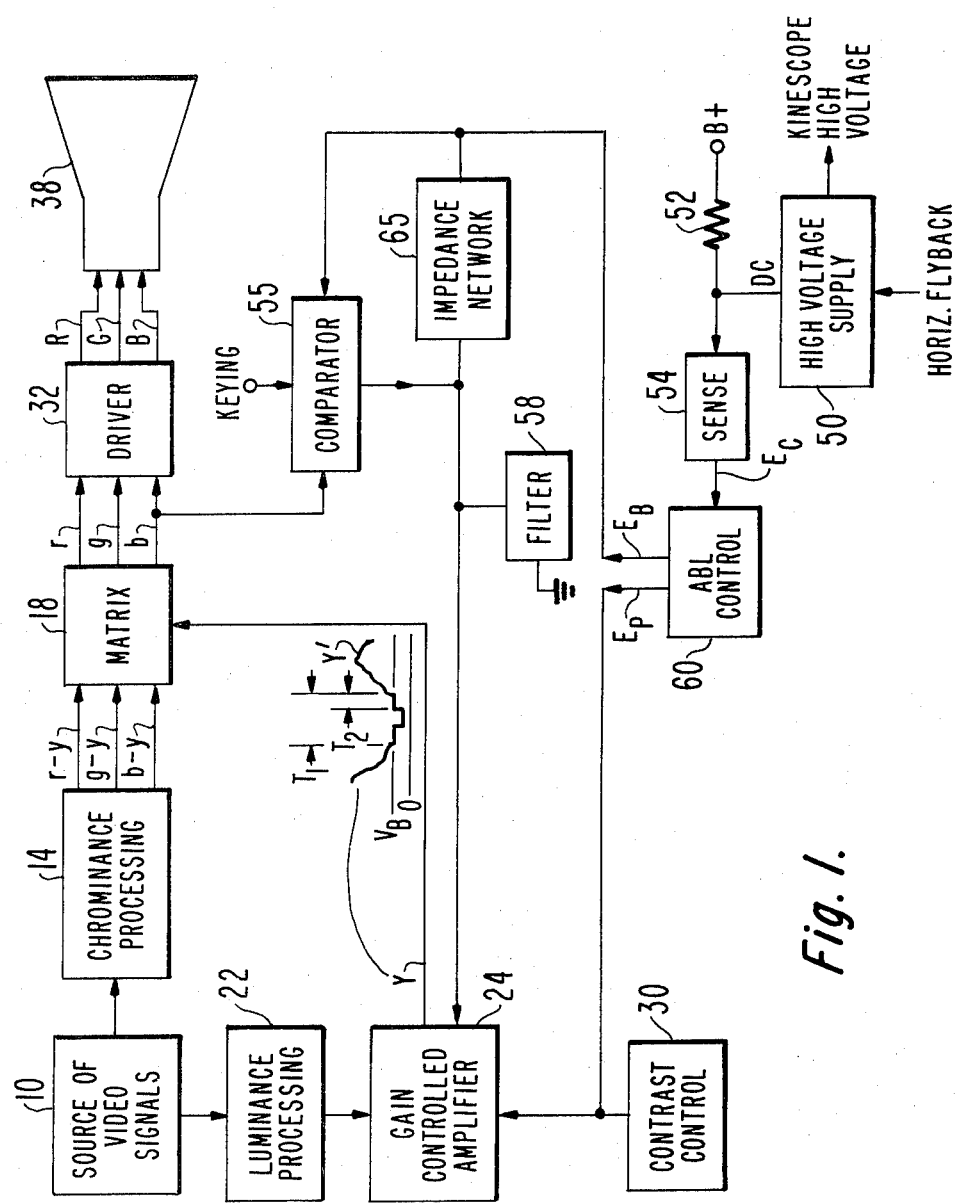

United States Patent [19]

Shanley, II et al.

[11] 4,295,166
[45] Oct. 13, 1981

[54] FAILURE COMPENSATED AUTOMATIC KINESCOPE BEAM CURRENT LIMITER

[75] Inventors: Robert L. Shanley, II; James Hettiger, both of Indianapolis, Ind.

[73] Assignee: RCA Corporation, New York, N.Y.

[21] Appl. No.: 118,855

[22] Filed: Feb. 5, 1980

[51] Int. Cl.³ .............................................. H04N 5/68
[52] U.S. Cl. .................................................... 358/243
[58] Field of Search .................. 358/168, 169, 243, 74

[56] References Cited

U.S. PATENT DOCUMENTS 4,126,884 11/1978 Shanley .................................. 358/21
4,137,552 1/1979 Serafini ................................. 358/243

*Primary Examiner*—Robert L. Richardson
*Attorney, Agent, or Firm*—Eugene M. Whitacre; William H. Meagher; Ronald H. Kurdyla

[57] ABSTRACT

An automatic kinescope beam current limiter for a television receiver includes a source of derived beam current representative voltage, a keyed sampling circuit for developing an output beam current control voltage on a charge storage capacitor in response to the derived voltage, and an auxiliary current path including an impedance coupled between the output capacitor and the source of derived voltage. In a normal beam limiting control mode, the control voltage from the sampling circuit serves to modify the television signal in response to the derived voltage in a direction to limit excessive beam current. In an abnormal control mode such as when the sampling circuit is inoperative due to disrupted keying, current is conducted via the auxiliary current path in response to the derived voltage to modify the control voltage on the capacitor with a sense and at a rate for limiting excessive beam current, to thereby preserve beam limiting capability.

10 Claims, 2 Drawing Figures

FAILURE COMPENSATED AUTOMATIC KINESCOPE BEAM CURRENT LIMITER

This invention relates to an arrangement including a control circuit for limiting excessive beam currents conducted by a kinescope in a television receiver. In particular, the invention concerns such an arrangement also including provision for maintaining beam limiting capability when normal operation of the control circuit is disrupted.

The content of an image reproduced by a kinescope in a television receiver comprises luminance information, and also chrominance information in the case of a color television system. Picture information as displayed by the kinescope is typically defined by the peak-to-peak amplitude component of the video signal, relating to image contrast, and by the black level representative D.C. component of the video signal, relating to image brightness or background level. Both of these components can contribute to excessive beam currents conducted by the kinescope.

Excessive beam currents can cause a receiver to produce a degraded image such as by impairing the operation of the receiver deflection system, causing beam spot defocusing, and producing picture "blooming." High beam currents may also exceed the safe operating current capability of the kinescope, possibly damaging the kinescope and associated circuit components.

A particularly advantageous automatic beam limiter system, for sequentially controlling the peak-to-peak and D.C. components of the video signal in the beam limiting mode, is described in a copending U.S. patent application Ser. No. 103,445 of L. A. Harwood, et al. entitled, "Automatic Kinescope Beam Current Limiter With Sequential Control Modes." In that system, excessive beam currents over a first range are limited by controlling the peak-to-peak amplitude of the video signal, and excessive beam currents over a second range of relatively greater currents are limited by controlling the D.C. component of the video signal.

Also as disclosed for that system, control of the video signal D.C. component over the second range of greater currents is achieved in cooperation with a keyed network in a closed control loop, of the type described in U.S. Pat. No. 4,143,398—L. A. Harwood, et al. and in a U.S. Pat. No. 4,197,557 of A. V. Tuma, et al., Ser. No. 794,128 entitled, "Brightness Control Circuit Employing A Closed Control Loop." In that network, a keyed sampling circuit including a charge storage capacitor forms a closed control loop with a video signal processing channel. In pertinent part, the sampling circuit is keyed during periodic blanking intervals of the video signal to compare the level of a beam limiting control voltage with a blanking level of the video signal in the beam limiting mode. The output of the sampling comparator circuit varies in accordance with the beam limiting control voltage and is utilized to control the video signal so as to limit the beam current conducted by the kinescope.

It is herein recognized as desirable to maintain the beam current limiting capability of a control network of the type described particularly when, among other factors, the keying signal input to the control network, and thereby the operation of the control network, is disrupted.

Disruption of the keying signal can result from a variety of conditions, but is particularly likely to occur when the keying signal is derived from the synchronizing (sync) component of the video signal and the video signal is disrupted. This can occur, for example, when switching between channels, when temporarily tuning to an unused channel, when a transmitted signal is temporarily lost for various reasons, or when multipath or reflected signals distort the received television signal. Under these circumstances, the beam current limiting capability is impaired with objectionable and potentially damaging results when, for example, normal beam current conditions exist prior to loss of keying, and a condition of excessive beam current develops before proper keying is re-established (e.g., changing from one channel with a low picture brightness level to another channel with a high brightness level sufficient to produce excessive beam current levels). Also, some television receivers include an automatic gain control mechanism which greatly increases the gain of receiver input signal amplifying networks under conditions of weak or lost signal. Increased signal gain in a white direction may result in a raster level sufficient to require beam limiting action. The absence of keying signals in this case precludes such action. A sync-derived keying signal can also be lost when the sync component of a broadcast video signal does not conform to prescribed standards. Component failure represents another possible but less likely cause of disrupted control network operation.

In accordance with the present invention, apparatus is included in a video signal processing system including a video signal channel, for automatically limiting excessive beam currents conducted by an image reproducing kinescope responsive to the video signal. The apparatus includes a network for deriving a signal representative of the magnitude of excessive kinescope beam currents above a threshold level, a charge storage device, and a control circuit with an input coupled to the derived signal and an output coupled to the charge storage device via a first current conduction path. The control circuit responds to the derived signal for developing a control signal on the charge storage device proportional to the magnitude of the derived signal, in a normal control mode. The control signal is coupled to the video channel via a second current conduction path with a sense for modifying the video signal in a direction to limit kinescope current conduction above the threshold level in accordance with the magnitude of the control signal. The apparatus also includes an impedance network coupled to the charge storage device for defining an auxiliary current conduction path with respect to the charge storage device, independent of the first and second current paths. The impedance network is responsive to the derived signal for modifying the charge on the charge storage device via the auxiliary current path, in a direction for modifying the control signal and thereby the video signal to limit kinescope current conduction in a disrupted control mode of the control circuit.

Figure 2:
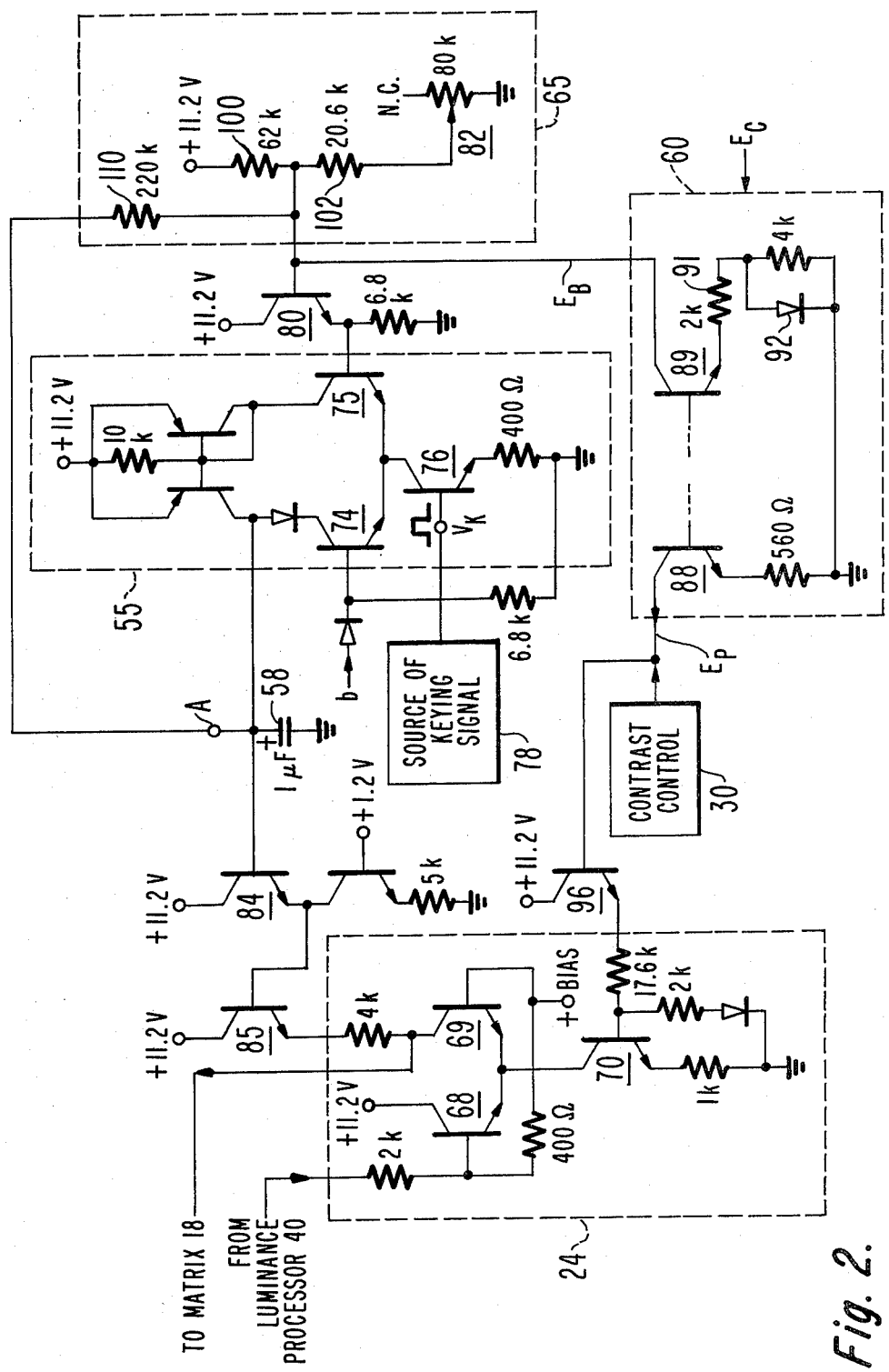

In the drawing:

FIG. 1 illustrates a block diagram of a portion of a color television receiver including automatic beam current limiting control apparatus according to the present invention; and FIG. 2 shows schematic circuit diagram details of a portion of the apparatus of FIG. 1.

In FIG. 1, a source 10 of video signals including luminance and chrominance components provides a separated chrominance component from one output to a chrominance signal processing unit 14 in a chrominance channel of the receiver, which procudes r-Y, g-Y and b-Y color difference signals. A separated luminance component is supplied from another output of unit 10 to a luminance processing unit 22 in a luminance channel of the receiver. Luminance signals processed by unit 22 are supplied to a signal input of a gain controlled luminance amplifier 24 (e.g., a differential amplifier). A viewer adjustable contrast control unit 30 (e.g., a potentiometer) is coupled to a gain control input of amplifier 24 for varying the gain of amplifier 24, and thereby the peak-to-peak amplitude of output signals from amplifier 24, in accordance with the setting of contrast control 30.

An amplified luminance signal (Y) from an output of amplifier 24 is supplied to a luminance-chrominance signal matrix 18 where the luminance signal is combined with the color difference signals from unit 14 to produce output r, g, and b color image representative signals. The luminance signal (Y) and thereby the r, g, and b color signals include a horizontal picture blanking interval ($T_1$) occurring between each horizontal picture scanning interval. The blanking interval contains a blanking reference interval ($T_2$) which encompasses the color burst interval in the case of a color television signal. A blanking level $V_B$, approximating a black picture level, occurs during interval $T_2$. A horizontal sync pulse also occurs during interval $T_1$, prior to interval $T_2$. The r, g, b signals are respectively amplified by a kinescope driver amplifier stage 32 to produce high level amplified R, G, and B color signals. The R, G, B signals are supplied to respective red, green and blue intensity control electrodes of a color kinescope 38.

The system of FIG. 1 also includes a keyed sampling comparator 55 arranged in a closed automatic brightness and beam current limiting control loop as follows. A signal input of comparator 55 senses the low level blue (b) signal output of matrix 18, and a reference input of comparator 55 senses both a brightness determinative reference voltage and a beam current control voltage as will be discussed. Comparator 55 is keyed to operate in response to keying signals occurring during periodic horizontal image blanking intervals ($T_2$) of the video signal, for sampling and comparing the blanking level ($V_B$) of the signal then appearing at the b signal output of matrix 18 with the brightness reference level (under normal conditions), or with the beam current control signal (in the beam limiting mode). If an imbalance exists between the comparator input levels, comparator 55 generates an output control signal which is stored by a charge storage filter network 58 and applied to a D.C. level control input of luminance amplifier 24. The control signal serves to modify the D.C. level of the output signal from amplifier 24, and thereby also the D.C. level of the r, g, and b output signals from matrix 18, in a direction to minimize the difference between the sampled signal inputs to comparator 55. By this mechanism, the luminance signal D.C. level and thereby the brightness determinative D.C. level of each of the r, g, b signals can be varied by varying the level of the signals applied to the reference signal input of comparator 55. In particular, the luminance D.C. level can be controlled in a direction to limit the average kinescope beam current conduction in the beam current limiting mode. Additional details of the closed control loop including comparator 55, amplifier 24 and matrix 18 are found in the copending U.S. patent application Ser. No. 794,128 of A. V. Tuma noted previously, now U.S. Pat. No. 4,197,557.

Automatic kinescope beam current limiting is accomplished by means of an ABL control network 60 which responds to an input voltage $E_c$ derived from resupply currents supplied to a kinescope high voltage supply unit 50.

High voltage supply 50 (e.g., a voltage tripler) generates high operating voltages for ultor and focus electrodes of kinescope 38. Periodic horizontal flyback pulses developed during horizontal image retrace blanking intervals are supplied to an input of high voltage source 50. A source of kinescope resupply current including an operating supply voltage (B+) and a resistor 52 is coupled to a D.C. input of supply 50. Currents flowing into the D.C. input of supply 50 are representative of the beam current demand of the kinescope.

In this example, voltage $E_c$ is representative of the average kinescope beam current demand, and is provided from an average responding sensing circuit 54. Sensing circuit 54 (e.g., including a filter capacitor) may comprise any circuit arrangement suitable for sensing the magnitude of average beam current demand from currents supplied via resistor 52 to high voltage source 50. For example, sensing circuit 54 can comprise networks of the type disclosed in U.S. Pat. No. 4,137,552—Serafini and U.S. Pat. No. 4,067,048—Norman.

Control network 60 responds to voltage $E_c$ for providing a contrast control beam current limiting signal $E_p$ and a brightness control beam current limiting signal $E_B$, when excessive average beam current demand above a given threshold level is present.

Signal $E_p$ is proportional to the magnitude of excessive average beam current demand over a first range of beam currents. This signal is applied to the gain control input of amplifier 24 for modifying the gain of amplifier 24, and thereby the peak-to-peak amplitude of signals processed by amplifier 24, in a direction to limit excessive beam current demand above the threshold level within the first range. Picture contrast is modified accordingly. Signal $E_B$ is proportional to excessive average beam currents over a second range of relatively greater beam currents. This signal is applied to the reference signal input of comparator 55 for modifying the D.C. level of the video signal, and thereby picture brightness, in a direction to limit excessive beam currents within the second range of currents. Control network 60 is also arranged to provide both contrast and brightness control signals $E_p$ and $E_B$ during a transition region in response to an intermediate range of excessive beam currents between the first and second ranges of beam currents. Additional details concerning the structure and operation of ABL control network 60 are found in the previously noted copending U.S. patent application Ser. No. 103,445 of L. A. Harwood entitled, "Automatic Kinescope Beam Current Limiter With Sequential Control Modes."

The arrangement of FIG. 1 also includes an impedance network 65 coupled to comparator output filter 58 and to the output of network 60 at which signal $E_B$ is developed. Circuit details of network 65, comparator 55, filter 58, amplifier 24 and ABL network 60 are shown in FIG. 2.

In FIG. 2, luminance amplifier 24 comprises differentially-connected transistors 68, 69 and an associated current source transistor 70. Comparator 55 comprises differentially-connected input transistors 74, 75 and an associated keyed current source transistor 76. Transistor 76 is keyed to conduct in response to positive keying pulses $V_K$ which occur during time $T_2$ of each horizontal blanking interval $T_1$. The keying pulses are supplied from a source of composite keying signal 78, which derives a composite keying signal from the horizontal synchronizing component of the video signal in this example. Souce 78 can be of the type disclosed in a copending U.S. patent application Ser. No. 113,371 of R. L. Shanley, II, et al. entitled, "Controlled Output Composite Keying Signal Generator For A Television Receiver."

Signal b from matrix 18 is supplied to a video signal input of comparator 55 at the base input of transistor 74. Signals applied to the reference input of comparator 55, corresponding to the base input of transistor 75, are coupled via a follower transistor 80. The signals supplied to this input of comparator 55 include signal $E_B$ from ABL network 60, and a brightness reference voltage derived from the wiper of a viewer adjustable resistor 82 included in network 65. An output signal from comparator 55 is derived from the collector circuit of transistor 74 (including a transistor active load circuit), and is developed on and stored by a filter capacitor 58. The level of voltage on capacitor 58 increases or decreases in accordance with the difference in magnitude between the input signals supplied to comparator transistors 74 and 75, when these transistors are rendered conductive as current source transistor 76 is keyed to conduct during the periodic blanking intervals.

The voltage on capacitor 58 is coupled via transistors 84 and 85 to the collector output circuit of transistor 69 in amplifier 24, for modifying the D.C. level of the luminance output signal of amplifier 24 in accordance with the voltage on capacitor 58 as developed during the horizontal blanking intervals. The corresponding D.C. blanking levels of the r, g, b color signals from matrix 18 are modified accordingly. By closed loop control action, the voltage developed on capacitor 58 in response to the operation of comparator 55 serves to vary the D.C. blanking level of the color signals in a direction to minimize the difference between the levels of the signals applied to comparator transistors 74 and 75, thereby effecting the desired control of the D.C. level of the video signals ultimately supplied to the kinescope.

In the beam current limiting mode when the kinescope conducts excessive beam currents within a first range above a threshold level, ABL network 60 provides a decreasing voltage $E_p$ from a collector output of a transistor 88 in network 60. This voltage is supplied via a transistor 96 to current source transistor 70 in amplifier 24. Voltage $E_p$ serves to reduce the conduction of transistor 70, and thereby the gain of amplifier 24 and the peak-to-peak amplitude of signals processed by amplifier 24, in a direction to limit kinescope current conduction over the first range of excessive beam currents.

Control network 60 provides voltage $E_B$ when the kinescope conducts excessive current over a second range of currents, significantly greater than currents within the first range. At this time a transistor 89 in network 60 is biased for increased conduction in response to voltage $E_c$, to produce collector output voltage $E_B$. An emitter of transistor 89 is coupled to ground via a bias resistor 91 and a conductive diode 92. Voltage $E_B$ becomes increasingly less positive with increasing excessive beam currents over the second range. This voltage is coupled to comparator 55 via transistor 80 and serves to proportionally decrease the voltage on capacitor 58 during the blanking intervals when comparator 55 is keyed. This is accomplished by proportionally discharging capacitor 58 via the collector-emitter path of transistor 74. The decreased charge on capacitor 58 then serves to modify the D.C. level of the luminance output signal from amplifier 24 in a direction to correspondingly decrease the magnitude of the kinescope drive signals, thereby limiting kinescope current conduction to an acceptable level.

The described operation of the keyed system of FIG. 2 during the beam limiting mode in response to very high excessive beam currents over the second range requires that comparator 55 operate properly (e.g., be properly keyed) to achieve the desired closed loop control. Beam current limiting over the second range cannot ordinarily be accomplished if, for example, the keying signal input to comparator 55 is disrupted for a significant period of time. However, network 65 is arranged so that this beam limiting capability is maintained in the event that the operation of comparator 55 is disrupted.

Network 65 comprises a voltage divider including resistors 100 and 102 arranged in series with an adjustable, non-linear brightness control resistor 82 between a D.C. supply voltage (+11.2 volts) and a point of reference potential (ground). A resistor 110 is coupled between a point at the junction of resistors 100 and 102, and the output of comparator 55 to which capacitor 58 is coupled. Brightness control resistor 82 is included in network 65 in this example. However, variable resistor 82 could be replaced by a fixed resistor of appropriate value, and other provisions can be made for providing normal brightness control via an adjustable resistance.

For ordinary operating conditions in both the normal and beam limiting modes of the described control system, network 65 presents an equivalent impedance to the point at which capacitor 58 is coupled at the output of comparator 55. This impedance is defined by the values of the resistors forming network 65 according to expression:

$$\left[ \frac{(R_{102} + R_{82}) \times (R_{100})}{R_{102} + R_{82} + R_{100}} \right] + R_{110} \quad (1)$$

where the subscripted reference numbers for the elements of this expression correspond to the component reference numbers shown in the drawing. In this embodiment, the equivalent impedance (approximately 242 kilohms) is determined for a value of resistor 82 corresponding to a normally expected brightness setting of resistor 82. In this example, resistor 82 exhibits a non-linear taper. Network 65 develops a voltage at the junction of resistors 100 and 102 according to the expression:

$$\frac{R_{82} + R_{102}}{R_{82} + R_{100} + R_{102}} \times 11.2 \text{ volts.} \quad (2)$$

This voltage is approximately +4 volts for a normally expected brightness setting of resistor 82, and corresponds to the voltage normally developed on capacitor 58. Therefore, the voltages developed at either side of resistor 110 are normally substantially equal, and resistor 110 typically conducts little or no charge to or from capacitor 58. Any change in the normally expected level of charge on capacitor 58 due to current conducted by resistor 110 can be compensated for by the operation of comparator transistor 74, which normally serves to discharge capacitor 58, and by the operation of active load current source transistors in the collector circuits of transistors 74 and 75, which normally serves to charge capacitor 58. This is accomplished by closed loop action of capacitor 58 with comparator 55. Network 65 does not alter the desired control action provided by comparator 55 in the normal beam limiting mode over the second range of excessive beam currents, when the conduction of transistor 89 in network 60 increases in response to signal $E_c$.

The impedance and voltage normally presented to capacitor 58 by network 65 (as defined by expressions (1) and (2) above) are altered under abnormal conditions when high beam currents within the second range occur, and when the control system including comparator 55 fails to provide beam limiting control due to disrupted keying of comparator 55, for example. Transistor 89 in ABL control network 60 conducts as in the normal mode, and exhibits a decreasing collector voltage ($E_B$) below +4 volts with increasing collector current conduction. If the excessive beam current is sufficient to cause transistor 89 to saturate, the collector voltage of transistor 89 and thereby control voltage $E_B$ closely approaches the relatively low emitter potential of transistor 89 (approximately one volt).

Charge from capacitor 58 flows as discharge current in an auxiliary current path including resistor 110 when comparator 55 is disabled in the beam limiting mode. Charge is removed from capacitor 58 via resistor 110 with a sense and at a rate sufficient to modify the D.C. level of the luminance signal in a direction to limit the otherwise uncontrolled excessive beam current within the second range. The auxiliary discharge path for charge on capacitor 58 is via resistor 110, the collector-emitter junction of transistor 89, resistor 91, diode 92, to ground. This discharge path exhibits a significantly lower impedance and faster discharge time constant than is otherwise available for discharging capacitor 58 in this example. Without the arrangement including resistor 110, capacitor 58 could only be discharged via transistor 84 when comparator transistor 74 is inoperative. Illustratively, for the circuit shown and assuming a four volt level on capacitor 58, approximately four seconds are required to discharge capacitor 58 significantly via base current of transistor 84 (approximately one microampere). This time is considered to be excessively long for discharging capacitor 58 to achieve beam current limiting, particularly when extremely high beam currents are present as indicated by a saturated condition of transistor 89.

With the arrangement including resistor 110, the time constant for discharging capacitor 58 under abnormal conditions is essentially determined by the product of the value of capacitor 58 and the value of resistor 110, or approximately 0.22 seconds in this example. This is significantly faster than the discharge time constant of about four seconds otherwise available. The value of this time constant (0.22 seconds) is not critical, but preferably should be on the order of the rate of discharge normally associated with the operation of comparator 55 and transistor 74 in particular. The value of resistor 110 is chosen to be sufficiently small so that capacitor 58 can be discharged quickly under the described disrupted control condition, but large enough so that normal operation of comparator 55 remains unimpaired. The value of comparator output capacitor 58 should be large enough so that capacitor 58 does not develop a voltage in response to spurious signals such as noise which may appear during comparator sampling intervals. Therefore, simply reducing the value of capacitor 58 to reduce the discharge time constant (i.e., increase the discharge rate) of capacitor 58 during the described abnormal conditions would undesirably compromise the normal operation of the comparator circuit.

What is claimed is:

1. In a system for processing an image representative video signal, said system including a video signal processing channel; and a kinescope for reproducing an image in response to video signals applied to said kinescope from said channel; apparatus for automatically limiting excessive beam currents conducted by said kinescope above a threshold level; said apparatus comprising:

means for deriving a signal representative of the magnitude of excessive kinescope beam currents above said threshold level;

charge storage means;

control means with an input coupled to said derived signal and an output coupled to said charge storage means via a first current conduction path, said control means normally being responsive to said derived signal for developing a proportional control signal on said charge storage means via currents conducted by said first current path in accordance with the magnitude of said derived signal in a normal control mode;

means for coupling said control signal to said video channel via a second current conduction path with a sense for modifying said video signal in a direction to limit kinescope current conduction above said threshold level in accordance with the magnitude of said control signal; and means for modifying the charge on said charge storage means and thereby modifying said control signal and video signal to limit kinescope current conduction when excessive kinescope currents occur and normal operation of said control means is disrupted, said charge modifying means comprising impedance means coupled to said charge storage means and to said signal deriving means, for defining an auxiliary current conduction path, independent of said first and second current paths, between said charge storage means and a circuit point exhibiting a voltage responsive to said derived signal, wherein the response of said circuit point voltage to said derived signal is such that (1) a given differential voltage relationship exists between the voltage developed on said charge storage means and the voltage at said circuit point when said control means operates in said normal control mode, thereby causing said auxiliary path to conduct a given level of current during said normal control mode, and (2) said voltage relationship changes and said current in said auxiliary path departs from said given level in response to said derived signal when excessive kinescope currents occur and normal operation of said control means is disrupted.

2. Apparatus according to claim 1 and further comprising:

a source of keying signals coincident with a prescribed interval of said video signal; and wherein said control means is rendered operative to provide said control signal in said normal control mode in response to said keying signals.

3. Apparatus according to claim 1, wherein:
said deriving means comprises a controlled conduction active device with a main current conduction path coupled between said impedance means and a point of operating potential.

4. Apparatus according to claim 1 in a television receiver including a video signal channel for processing an image representative video signal having periodically recurring image intervals, and image blanking intervals disposed between adjacent image intervals and containing a blanking level, wherein:
said control means comprises comparator means for comparing said blanking level and said derived signal during said blanking interval to provide said control signal indicative of the difference between said blanking level and said derived signal in said normal control mode; and
said control signal is coupled to said video channel for varying said blanking level in a direction to reduce said difference to a minimum and thereby limiting kinescope current conduction above said threshold level.

5. In a television receiver including a video signal channel for processing an image representative video signal having periodically recurring image intervals, and image blanking intervals disposed between adjacent image intervals and containing a blanking level determinative of image brightness; and a kinescope for reproducing an image in response to video signals applied to said kinescope from said channel; apparatus for automatically limiting excessive beam currents conducted by said kinescope above a threshold level, said apparatus comprising:
means for deriving a signal representative of the magnitude of excessive kinescope beam currents;
means for providing keying signals coincident with a portion of said blanking interval containing said blanking level;
charge storage means;
comparator means responsive to said keying signals and having a first input coupled to said deriving means for sensing said derived signal, a second input coupled to said video channel at a first point for sensing said blanking level, and an output coupled to said charge storage means via a first current conduction path, for developing a control signal on said charge storage means via currents conducted by said first current path in response to a signal difference appearing between said first and second inputs and representative of the difference in magnitude between said blanking level and said derived signal in a normal control mode;
means including a second current conduction path for coupling said control signal to a second point in said video channel prior to said first point to form a closed control loop with said video channel, for varying said blanking level in a direction to reduce said signal difference to a minimum, such that said video signal is modified in a direction to limit excessive kinescope current conduction in accordance with the magnitude of said derived signal in said normal control mode; and
means for modifying the charge on said charge storage means and thereby modifying said control signal and video signal to limit kinescope current conduction when excessive kinescope currents occur and normal operation of said comparator means is disrupted, said charge modifying means comprising
impedance means coupled to said charge storage means and to said signal deriving means, for defining an auxiliary current conduction path, independent of said first and second current paths, between said charge storage means and a circuit point exhibiting a voltage responsive to said derived signal, wherein the response of said circuit point voltage to said derived signal is such that (1) a given differential voltage relationship exists between the voltage developed on said charge storage means and the voltage at said circuit point when said comparator means operates in said normal control mode, thereby causing said auxiliary path to conduct a given level of current during said normal control mode, and (2) said voltage relationship changes and said current in said auxiliary path departs from said given level in response to said derived signal when excessive kinescope currents occur and normal operation of said comparator means is disrupted.

6. Apparatus according to claim 5, wherein:
said deriving means comprises a controlled conduction active device with a main current conduction path coupled to said first input of said comparator means; and
said impedance means is coupled to said charge storage means and to said main current conduction path of said active device such that said auxiliary current path comprises said impedance means and said main current conduction path.

7. Apparatus according to claim 6, wherein said impedance means comprises:
a voltage divider network coupled between first and second points of operating potential; and
an impedance device coupled from said charge storage means, to a point in said voltage divider and to said current conduction path of said active device.

8. Apparatus according to claim 7, wherein:
said charge storage means comprises a capacitance, said capacitance and said impedance means determining one time constant in said normal control mode and a modified time constant in said disrupted control mode for modifying the charge stored by said capacitance and thereby said control signal at a rate sufficient to effect beam limiting control in said disrupted control mode.

9. Apparatus according to claim 8, wherein:
said voltage divider network comprises image brightness control means coupled to said first comparator input.

10. Apparatus according to claim 5, wherein:
said deriving means comprises a transistor with a main current conduction path coupled to said first comparator input, said transistor exhibiting variable conduction in accordance with the magnitude of excessive kinescope current conduction above said threshold level; and
said impedance means comprises
a voltage divider network coupled between first and second points of operating potential and including a variable image brightness control resistance coupled to said first comparator input; and
a resistance coupled from said charge storage means, to a point in said voltage divider and to said main current conduction path of said transistor whereby said auxiliary current conduction path comprises said resistance and said main current conduction path of said transistor.

* * * * *